(12) United States Patent
Wadhwani et al.

(10) Patent No.: US 10,167,965 B2
(45) Date of Patent: Jan. 1, 2019

(54) NON RETURN VALVE FOR USE IN WATER LINE

(71) Applicant: Jain Irrigation Systems Limited, Jalgaon (IN)

(72) Inventors: Jaikishan P. Wadhwani, Jalgaon (IN); Ajit Bhavarlal Jain, Jalgaon (IN)

(73) Assignee: Jain Irrigation Systems Limited, Bambhori, Jalgaon (IN)

( * ) Notice: Subject to any disclaimer, the term of this patent is extended or adjusted under 35 U.S.C. 154(b) by 0 days.

(21) Appl. No.: 15/109,499

(22) PCT Filed: Dec. 31, 2014

(86) PCT No.: PCT/IN2014/000807
§ 371 (c)(1),
(2) Date: Jul. 1, 2016

(87) PCT Pub. No.: WO2015/111072
PCT Pub. Date: Jul. 30, 2015

(65) Prior Publication Data
US 2016/0334026 A1    Nov. 17, 2016

(30) Foreign Application Priority Data
Jan. 2, 2014  (IN) .............. 14/MUM/2014

(51) Int. Cl.
*F16K 15/02*   (2006.01)
*F16L 55/055*  (2006.01)
*F16K 1/36*    (2006.01)

(52) U.S. Cl.
CPC .............. *F16K 15/021* (2013.01); *F16K 1/36* (2013.01); *F16L 55/055* (2013.01)

(58) Field of Classification Search
CPC ......... F16K 15/021; F16K 1/36; F16L 55/055
USPC ................................ 137/533.11–533.31, 539
See application file for complete search history.

(56) References Cited

U.S. PATENT DOCUMENTS

| | | | | |
|---|---|---|---|---|
| 2,102,289 A | * | 12/1937 | Smolensky | ........... F16K 15/063 137/536 |
| 3,664,371 A | | 5/1972 | Schneider | |
| 4,781,213 A | | 11/1988 | Kilayko | |
| 5,117,861 A | * | 6/1992 | McConnell | ............. F16K 15/04 137/515.7 |
| 5,232,014 A | | 8/1993 | Hiltebrand | |
| 6,684,415 B1 | * | 2/2004 | Kozono | ................... E03C 1/12 137/512 |

FOREIGN PATENT DOCUMENTS

JP    2007/155118 A    6/2007

* cited by examiner

*Primary Examiner* — P. Macade Nichols
(74) *Attorney, Agent, or Firm* — Pepper Hamilton LLP

(57) ABSTRACT

The invention is a non-return valve comprising a housing, a guiding element mounted in the housing, a floating element having a transitional motion with respect to the guiding element, a support plate positioned below the floating element and a plurality of sealing elements mounted in the housing.

7 Claims, 2 Drawing Sheets

FLOW DIRECTION

FLOW DIRECTION

NON RETURN VALVE FOR USE IN WATER LINE

This application is a national phase filing under 35 U.S.C. § 371 of International Patent Application No. PCT/IN2014/000807, filed Dec. 31, 2014, which claims the benefit of Indian Patent Application No. 14/MUM/2014, filed Jan. 2, 2014, each of which is incorporated herein by reference in its entirety.

TECHNICAL FIELD

The present subject matter described herein, in general, relates to a flow control device, and more particularly a non-return valve which prevents the liquid flow in opposite direction.

BACKGROUND

Use of non-return valve results in reduced water hammer arising out of sudden change of flow direction because of pump shut off, resulting in increased life of piping system. Apart from safeguarding the piping system, the use of valve also safeguards the pump impeller and motor from damages that could arise because of immediate change in rotational direction arising out of flow reversal. So the proper selection and its installation are very important to reap the above fruits and improve the overall life and performance of the piping system. The use of non-return valve is very important in any kind of piping system to improve the life and performance of the piping system components. The piping system could be in any contour or direction depending on the requirement and the non-return valve used must perform flawlessly irrespective of the way it is used. The device should be cost effective. Typical flow control devices are not sealable at minimum pressure, pressure drop across the connection is high, not usable at any position, not capable of withstanding high hydraulic pressure acting on it, cannot perform over long periods of time, not rust resistant, not temper resistant and not compact in size.

The flow control devices available in the market are made of either plastic or metal.

But both plastic and metal flow control device has some disadvantages. Plastic devices available in the market can be only used in horizontal application. Plastic devices cannot be used directly in vertical condition under load. They cannot withstand the tensile load; assembly is easily openable so the device can be easily tempered. Performances of the plastic devices are variable. In case of metal devices pressure drop across connection is high. Sealing pressure requirement in metal devices is high. Reduction in flow passage is high in metal devices and cannot be used with plastic pipes directly. Rusting decreases the performance over the period of time. Metal devices are generally bulky in size which results a use limitation. It cannot be used directly with plastic pipes.

So there is a need of a product which can solve all the above mentioned problems.

SUMMARY

This summary is provided to introduce aspects related to a drip irrigation hose with an emitter for reducing deposition of fine silt and the aspects are further described below in the detailed description. This summary is not intended to identify essential features of the claimed subject matter nor is it intended for use in determining or limiting the scope of the claimed subject matter.

In an implementation of the present disclosure a non-return valve 100 is disclosed. The non-return valve may comprise a housing 102. Further, the housing 102 may comprise a guiding element 104 mounted in the housing 102. The non-return valve may further comprise a floating element 106 having a transitional motion with respect to the guiding element 104. Further, a support plate 108 may be positioned below the floating element 106. A plurality of sealing elements 110 may be mounted in the housing 102.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses a non-return valve for preventing the liquid flow in opposite direction. The non-return valve is used to prevent the liquid flow in the opposite direction when the supply is shut off, maintaining the water column in the upside pipes.

According to an embodiment of the present disclosure, a non-return valve may comprise of an enclosing body, a supporting plate, a guiding shell, a sealing element seat, a sealing elements, and a floating element.

In the present embodiment the non-return valve may be used in an upside piping system. When water or liquid flows from bottom to upward direction, the floating element may be lifted up due to the water/liquid pressure. The floating element keeps the valve open till the water continues to flow. A transitional motion between the floating element and the guiding shell allows the value to remain open. When the flow is interrupted or the pump is stopped, the reversal of water flow takes place which brings the floating element down, allowing the floating element to rest against the sealing element, and stopping the down word flow of water immediately and perfectly.

The supporting plate helps in withstanding the high hydraulic head acting on the floating element in the down ward direction. The floating element may have hemispherical shape on external and hollow inside. The sealing elements may help in making the non-return valve leak proof. The guiding shell may provide a passage for the water to flow in upward direction and also guide the floating element to move in a fixed direction, for e.g., transitional motion. This may enable the valve opening and closing operation very smooth. The sealing element may provide an efficient base for the sealing elements to make the system 100% leak proof.

Further, the non-return valve assembly may be capsuled or housed in the enclosing body.

Figure 1:
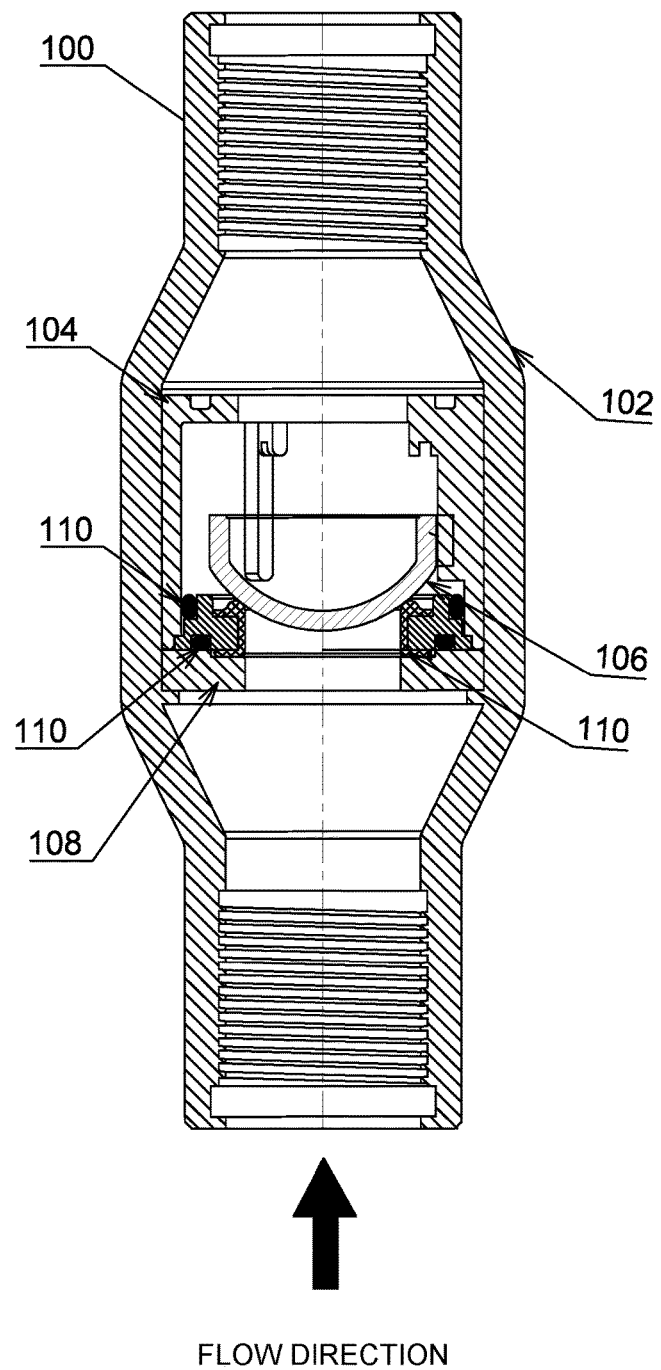
FIG. 1 illustrates a sectional view of the valve, in accordance with an embodiment of the present subject matter.

FIG. 1 of the present discloses a sectional view of a non-return valve 100, in accordance with an embodiment of the present subject matter. According to the embodiment the non-return valve may comprise a housing 102. The housing may further comprise a guiding element 104 mounted in the housing 102. The guiding element may have frame like structure with guide rails.

Further the non-return valve may comprise a floating element 106, housed in the housing 102. The floating element 106, may be mounted in the guiding element 104 such that, the floating element 106 may have translational motion with respect to the guiding element 104. According to an exemplary embodiment the floating element 106, may have hemispherical structure on an external side, and a hollow structure on an internal side. The hemispherical structure may have a curvature on at one end of the floating structure 104.

The non-return valve may further comprise a support plate 108 positioned below the floating element 104. The support plate 108, may enable the non-return valve to sustain a hydraulic force acting on the floating element 104. The support plate 108 may also support a plurality of sealing element 110, mounted in the housing 102.

Figure 2:
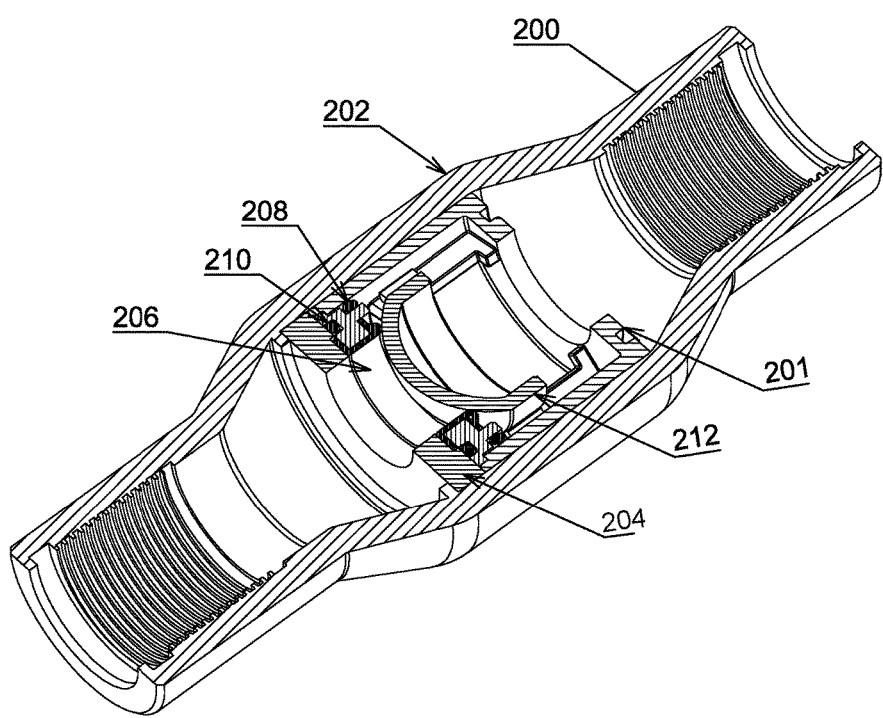
FIG. 2 illustrates a three dimensional sectional view of the valve, in accordance with an embodiment of the present subject matter.

FIG. 2 illustrates a three dimensional sectional view of a non-return valve 200, in accordance with an embodiment of the present subject matter. The non-return valve according to present disclosure may comprise a housing 202, a guiding element 201, a plurality of sealing elements for a leak proof system 206, 208 and 210, a support element 204 as a base for sealing element 206 and a floating element 212.

According to an exemplary embodiment of the present disclosure a liquid may be allowed to flow in an upward direction. The upward direction to liquid may be provided by a pump. Further, the floating element 210 may be lifted from a first position to a second position due to hydraulic pressure from the liquid.

In an embodiment the floating element 212 may be placed on at least one sealing element 206 from the plurality of sealing element 206, 208 and 210, in the first position. Further according to the embodiment the floating element may be placed away from the at least one sealing element 206 from the plurality of sealing element 206, 208 and 210.

Further, the liquid may continue to till the floating element 212 is in the second position. The guiding element 201 may enable a transitional motion or fixed motion to the floating element 212.

Further upon interruption to the flow the floating element 212 may return to the first position, i.e. coming to rest against the sealing element 206.

The supporting plate 204, may enable the non-return valve 200 withstand high hydraulic head acting on the floating element 212 in the downward direction.

We claim:

1. A non-return valve, comprising:
   a housing;
   a guiding element mounted in the housing, wherein the guiding element has a frame structure with guide rails;
   a floating element mounted in the guiding element, having a transitional motion with respect to the guiding element, wherein the floating element has a hemispherical structure on an external side and a hollow structure on an internal side;
   a support plate positioned below the floating element; and
   a plurality of sealing elements mounted in the housing;
   wherein the guiding element enables the transitional motion to the floating element seated on at least one of the plurality of sealing elements, so as to move from a first position to a second position within the guiding element and thereupon to return to the first position.

2. The non-return valve as claimed in claim 1, wherein the floating element has a curvature at one end of the hemispherical structure on the external side.

3. The non-return valve as claimed in claim 2, wherein the support plate is mounted below the curvature of the hemispherical structure of the floating element.

4. The non-return valve as claimed in claim 1, wherein the floating element is placed on at least one sealing element from the plurality of sealing elements, in the first position.

5. The non-return valve as claimed in claim 1, wherein the floating element is placed in the second position away from at least one sealing element from the plurality of sealing elements.

6. The non-return valve as claimed in claim 1, wherein the floating element is moveable between the first position on at least one sealing element from the plurality of sealing elements and the second position away from at least one sealing element from the plurality of sealing elements.

7. The non-return valve as claimed in claim 1, wherein the support plate supports the plurality of sealing elements mounted in the housing.

\* \* \* \* \*